United States Patent [19]

Bahler et al.

[11] Patent Number: 5,414,755
[45] Date of Patent: *May 9, 1995

[54] SYSTEM AND METHOD FOR PASSIVE VOICE VERIFICATION IN A TELEPHONE NETWORK

[75] Inventors: Lawrence G. Bahler; Alan L. Higgins, both of San Diego, Calif.

[73] Assignee: ITT Corporation, New York, N.Y.

[*] Notice: The portion of the term of this patent subsequent to Dec. 14, 2010 has been disclaimed.

[21] Appl. No.: 105,849

[22] Filed: Aug. 10, 1994

[51] Int. Cl.$^6$ ............................................. H04M 11/00
[52] U.S. Cl. .................................... 379/67; 379/189; 381/42
[58] Field of Search ................. 381/42; 379/67, 189

[56] References Cited

U.S. PATENT DOCUMENTS

| | | | |
|---|---|---|---|
| 3,700,815 | 10/1972 | Doddington et al. | |
| 3,816,722 | 7/1974 | Sakoe et al. | |
| 4,601,054 | 7/1986 | Watari et al. | |
| 4,653,097 | 3/1987 | Watanabe | 381/42 |
| 4,694,493 | 9/1987 | Sakoe | |
| 4,720,863 | 1/1988 | Li | 381/42 |
| 4,837,804 | 6/1989 | Akita | |
| 4,910,782 | 3/1990 | Watari | |
| 5,023,901 | 6/1991 | Sloan | 379/38 |
| 5,054,083 | 10/1991 | Naik et al. | 381/42 |
| 5,127,043 | 6/1992 | Hunt | 381/42 |
| 5,274,695 | 12/1993 | Green | 379/189 |

OTHER PUBLICATIONS

"A Voice Password System for Access Security" AT&T Technical Journal Sep./Oct. 1986 vol. 65 Issue 5.

Primary Examiner—James L. Dwyer
Assistant Examiner—Michael N. Lau
Attorney, Agent, or Firm—Arthur L. Plevy; Patrick M. Hogan

[57] ABSTRACT

A telephone long distance service is provided using speaker verification to determine whether a user is a valid user or an impostor. The user claims an identity by offering some form of identification, typically by entering a calling card number on the phone's touch-tone keypad or by a magnetic strip on the card which is read by the telephone. Unrestricted, extemporaneous speech of a group of customers are digitized, analyzed in accordance with a PCM circuit, and characterized as a nonparametric set of speech feature vectors. The extemporaneous speech of the long distance telephone service user claiming the identity of a service customer via his card number is digitized and analyzed in a like manner. The identity of the user is verified by comparing, either during or after the call, the signals in accordance with an algorithm which compares a reference utterance of a known customer with input utterances from one or more unknown telephone service users, one of which users has claimed the identity of the customer. This comparison results in a decision to accept or reject the hypothesized identity. The identity hypothesis to be tested is thus derived from the calling card of the customer.

21 Claims, 2 Drawing Sheets

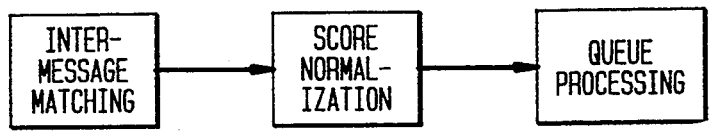
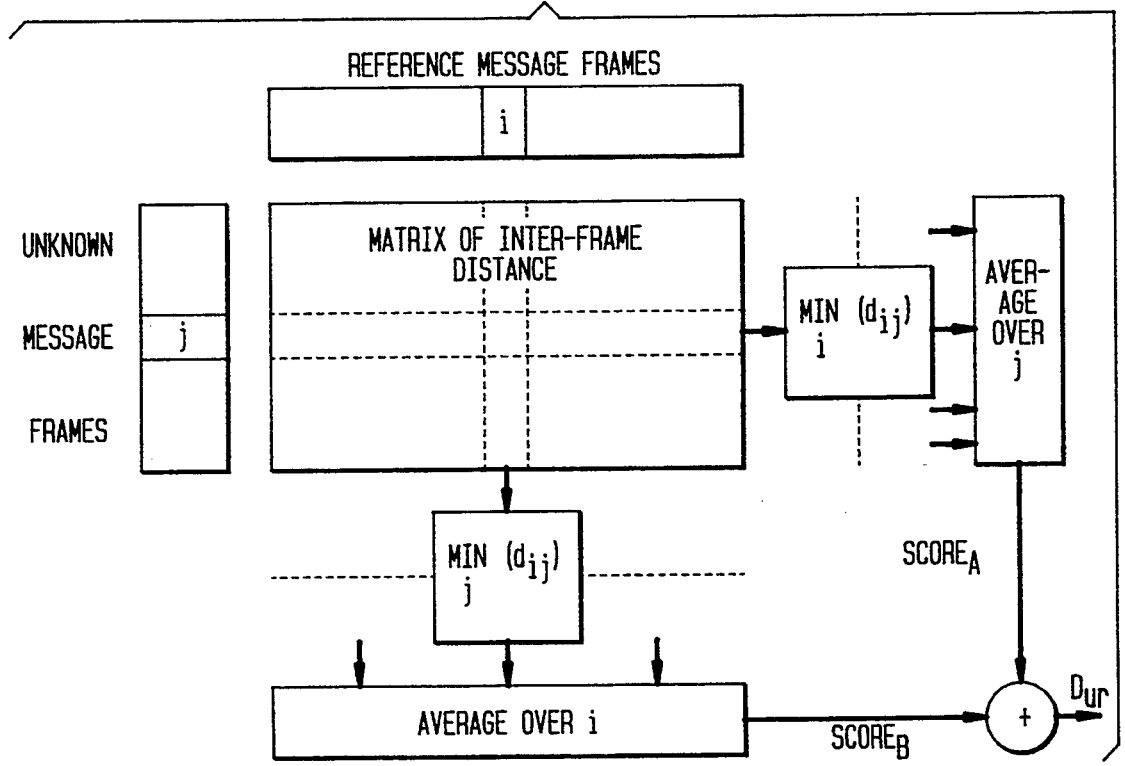
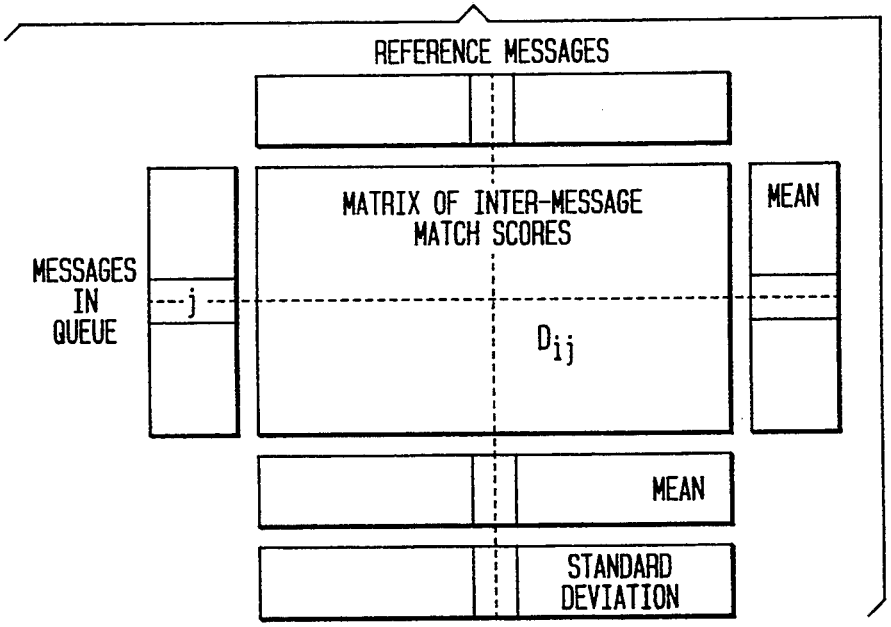

SYSTEM AND METHOD FOR PASSIVE VOICE VERIFICATION IN A TELEPHONE NETWORK

CROSS-REFERENCE TO RELATED APPLICATION

This invention is related to U.S. patent application Ser. No. 08/044,546, filed Apr. 7, 1993, now U.S. Pat. No. 5,271,088, issued Dec. 14, 1993.

BACKGROUND OF THE INVENTION

This invention relates generally to a speaker verification system and more particularly, to an apparatus and method for passive voice monitoring in a telephone network.

Long distance credit card services must identify a user to ensure that an impostor does not use the service under another person's identity. It has been estimated that the aggregate losses to the long distance services due to unauthorized use is in the one to four billion dollar range. Because of the magnitude of these losses, telephone companies are investigating methods of verifying the identity of the caller each time a call is placed. Prior art systems typically provide a lengthy identification number (calling card number) which must be entered via the phone's keypad to initiate the long distance service. Unfortunately, this approach is prone to abuse because the identification number may be easily appropriated by theft, or by simply observing the entry of the identification number by another. Accordingly, a biometric technique, as opposed to a method based solely on the knowledge of a password or possession of a key, is preferable. Voice is an ideal medium because every consumer already has the required equipment, a telephone.

A number of recognition techniques have been proposed for identifying a speaker on the basis of prerecorded samples of his speech. As is known in the art, it is possible to represent a voice pattern with a sequence of P-dimensional feature vectors. In accordance with the pattern to be represented, the number P may be from 1 to 10 or more. Speech utterances may be represented as collections of these vectors. In certain conventional speaker verification systems, the password speech pattern uttered by a registered speaker is stored as a reference pattern, and at the time of verification, a code specifying the speaker (hereinafter the "registered speech number") and the password spoken by a speaker to be verified are input. The reference pattern specified by the registered speaker number and the uttered speech pattern of the password (hereinafter the "input pattern") are compared with each other to calculate an evaluation value of dissimilarity therebetween. If the dissimilarity is smaller than a predetermined threshold value, the speaker is recognized as the registered person, and if the dissimilarity is greater, the speaker is judged to be an imposter.

Voice verification methods currently being tested by telephone companies prompt the user to speak one or more predetermined, short authorization phrases before a connection is made with the called party. The interactive session in which phrases are prompted and spoken takes about ten seconds. Even without considering the cost of such systems themselves, any savings in fraudulent charges realized by such voice verification systems may be easily offset or negated by other costs associated therewith. Such costs include the additional telephone line connection charges, the additional time consumers must spend to make a call, and the loss of business due to false rejections. Moreover, prior art speaker verification systems have not provided the necessary discrimination between true speakers and impostors to be commercially acceptable in applications where the speaking environment is unfavorable.

Speaker verification over long distance telephone networks present challenges not previously overcome. Variations in handset microphones result in severe mismatches between speech data collected from different handsets for the same speaker. Further, the telephone channels introduce signal distortions which reduce the accuracy of the speaker verification system. Also, there is little control over the speaking conditions. Finally, the need to prompt the customer to recite a predetermined speech sample and pre-analyze the same associated with prior art techniques imposes additional costs in the form of additional telephone line connection charges and the additional time customers must spend to place a call.

Accordingly, a need exists for a voice verification system to prevent calling card abuse over telephone lines. Further, a need has arisen to provide a speaker verification system which effectively, yet passively, discriminates between true speakers and impostors, particularly in a long distance network setting.

SUMMARY OF THE INVENTION

In accordance with the present invention, a speaker verification method and apparatus is provided which substantially reduces the problems associated with prior art verification systems.

A telephone long distance service is provided using speaker verification to determine whether a user is a valid user or an impostor. The user claims an identity by offering some form of identification, typically by entering a calling card number on the phone's touch-tone keypad or by a magnetic strip on the card which is read by the telephone. Unrestricted, extemporaneous speech of a group of customers are digitized, analyzed in accordance with a speech front-end processing circuit, and characterized as a non-parametric set of speech feature vectors. The extemporaneous speech of the long distance telephone service user claiming the identity of a service customer via his card number is digitized and analyzed in a like manner. The identity of the user is verified by comparing, either during or after the call, the signals in accordance with an algorithm which compares a reference utterance of a known customer with input utterances from one or more unknown telephone service users, one of which users has claimed the identity of the customer. This comparison results in a decision to accept or reject the hypothesized identity. The identity hypothesis to be tested is thus derived from the calling card of the customer.

BRIEF DESCRIPTION OF THE DRAWINGS

The above objects and further features and advantages of the present invention are described in detail below in conjunction with the drawings, of which:

FIG. 3 is a block diagram of the baseline algorithm showing the processing steps of inter-message matching, score normalization, and queue processing of the baseline algorithm used in verifying the identity of the unknown caller;

FIG. 4. is a schematic diagram illustrating the utterance matching and scoring process of the baseline algorithm depicted in FIG. 3; and FIG. 5 is a schematic diagram illustrating the score normalization process of the baseline algorithm depicted in FIG. 3.

DETAILED DESCRIPTION OF THE INVENTION

In accordance with the present invention, voice verification is performed using ordinary conversational speech without placing any limitations on the message content. Calls are made in the normal way and customers need not even be aware that passive monitoring is in effect. Passive monitoring achieved by the system of the present invention does not, however, affect the privacy of such calls because it does not include any provision for converting signals into an audible form.

Figure 1:
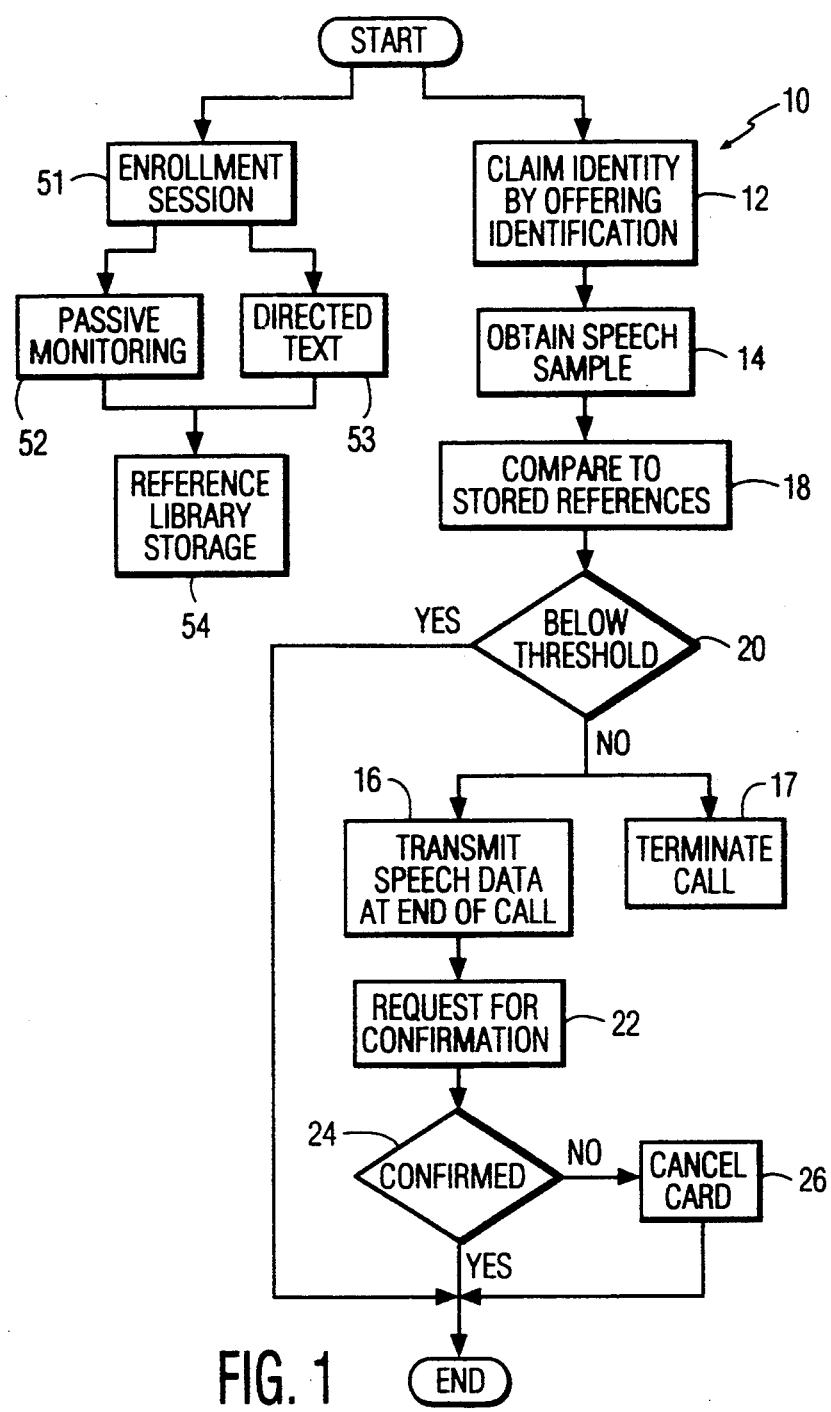
FIG. 1 illustrates a flow chart depicting a personal identity verification system for long distance calling card services using speech verification.

FIG. 1 illustrates a flow chart 10 depicting personal identity verification using speaker identification in connection with a long distance calling card service. In block 12, a person claims an identity by offering some information corresponding to a unique identification. For example, a long distance telephone subscriber may enter a unique ID number to claim his identity. Alternatively, if the user is utilizing a public telephone with a magnetic card reading capability, the ID number may be encoded on a magnetic strip on the card and read by passing the card through the reader.

Like current interactive verification methods, passive monitoring requires one or more enrollment or training sessions, block 51, with which to form a voice model for the customer. For this purpose, the customer may be asked to speak a reference sentence over his telephone to a central location, block 53. Preferably, however, in order to eliminate any burden on the part of the customer, the first telephone call or calls made using the card could be used as enrollment sessions, block 52, with verification applied to subsequent calls. A library of reference messages, block 54, is thus established at a central location to maintain a voice standard for each individual long distance telephone credit card subscriber. The reference messages may be stored in any conventional manner, such as, for example, on magnetic disks.

In block 14, the personal identity verification system of the present invention obtains a speech sample message from the calling party. At this stage, the speech sample message may be compared, in a manner to be described later, to reference data stored during a previous enrollment session in order to confirm whether the caller is indeed the calling card account holder, block 18. Naturally, the impact of a false rejection depends upon what action is taken next. Generally, only about one minute of the customer's speech need be monitored before a reliable decision (minimizing false rejections) can be reached, block 20. After a comparison has been made, the call may be terminated immediately, block 17 if the input speech utterance and reference speech data do not match.

A certain number of false rejections, however, must be anticipated despite the improvements in accuracy obtained by abandoning the assumed statistical model approach employed in prior art systems. At a minimum, terminating a valid call will annoy the caller. Potentially, it may also result in the loss of business. Therefore, a safer action would be to request the card-holder to confirm that the call was made (as quickly after the call as possible), where the comparison indicated a probability of an invalid identification and to invalidate the card number if the call was denied. Accordingly, the ability to interrupt calls in progress is not necessarily required. After the speech sample is compared to the reference data, as shown in block 18, in accordance with a passive monitoring algorithm to be described later, and upon failure of the match between the reference voice sample and the input speech utterance to satisfy the decision criteria in decision block 20, the verification data is transmitted to a central location at the end of such a call, block 16, and the customer is requested to confirm whether the call was made or authorized by him, as shown in block 22. If the answer is yes, no action is taken (block 24), but if the answer is no, the card is cancelled and a new one is issued to the customer (block 26). It will, of course, be appreciated by those of ordinary skill in the art that if the ability to interrupt calls in progress is required, the system may be modified to receive the caller speech data during the call and to terminate the call if the identity offered by the calling party is not accepted.

Passive Monitoring Algorithm

In accordance with the present invention, a text-independent, nonparametric approach to speaker recognition is used in which the reference data used to characterize the telephone credit card customer's speech patterns are a large set of speech feature vectors, not a set of estimated distribution parameters. A baseline algorithm for such a text-independent approach is described in U.S. patent application Ser. No. 08/044,546 filed on Apr. 7, 1993 by L. G. Bahler, now U.S. Pat. No. 5,271,088, which is a continuation of U.S. patent application Ser. No. 07/992,139 filed Jul. 30, 1992, which is a continuation of U.S. patent application Ser. No. 07/699,217 filed May 13, 1991, entitled "AUTOMATED SORTING OF VOICE MESSAGES THROUGH SPEAKER SPOTTING" and assigned to ITT, the assignee herein, which application is incorporated herein by reference.

In accordance with the algorithm disclosed in the aforementioned application, speech is convened into a parametric form in which the sound spectrum within each 20 millisecond "frame" is measured by a 14-dimensional vector. Speech utterances are represented as collections of these vectors. An algorithm is defined by which a reference utterance is compared with input utterances from a group of speakers, one of which speakers has claimed the identity of the customer. This comparison results in a decision to accept or reject the hypothesized identity. Passive monitoring is accomplished by applying the algorithm disclosed in the Bahler application to the speech of the calling party. The identity hypothesis to be tested is derived from the calling card.

Audio Speech Signal Processing

If desired, the user can be required to supply a voice sample which will serve as the reference model for future comparison in accordance with the present invention. As indicated above, however, the tint telephone call or calls made using the long distance calling card are preferably used as the enrollment session(s).

Thus, users of the system are not requested to supply an initial reference speech sample.

Figure 2:
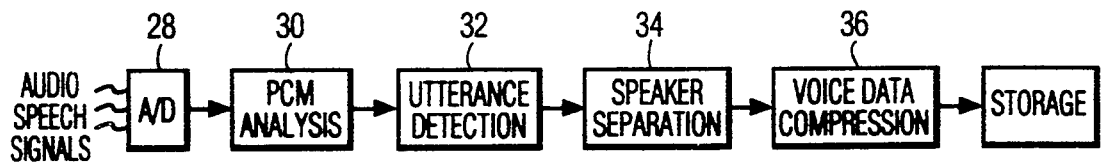
FIG. 2 illustrates a block diagram depicting the processing of enrollment and caller audio speech signals.

The present invention utilizes a speaker recognition system which may be of any known construction. Accordingly, as shown in FIG. 2, both the enrollment speech and the caller speech to be verified is digitized, using an A/D converter 28, into a series of frames of digital data at a given sampling rate. The digitized speech is subjected to speech front-end processing, i.e. pulse code modulation (PCM) in circuit 30. In a known manner, utterance detection circuit 32 estimates a speech utterance level parameter from RMS energy (computed during each 20 msec frame) using fast upward adaptation and slow downward adaptation. The utterance detection threshold is determined from a noise level estimate and a predetermined minimum speech utterance level. The end of an utterance is declared when the speech level estimate remains below a fraction (for example .10) of the peak speech utterance level for a predetermined interval (for example 500 msec).

In the telephone network, conversations are transmitted in one of two types of circuits. In a "two wire" circuit, the voices of the two parties are mixed so that both sides are present on a single wire pair. Techniques for the separation of the speech signals in two wire circuits are well known in the art and are discussed in a variety of references. Modern digital telephone switches employ "four wire" circuits. In a four wire circuit, the voices of the two parties are isolated on separate wire pairs. This is an ideal situation for passive monitoring because only the line should contain only the voice to be verified. In actual practice, however, four-wire circuits often deviate from ideal behavior by introducing some amount of "crosstalk" between the two parties. Crosstalk causes an attenuated signal from the called party to be present in the circuit assigned to the calling party.

In accordance with the present invention cross talk is eliminated by speaker separation circuit 34, to an extent adequate to obtain reliable speech data and thus to monitor the calling party, by measuring the signal energy in each of the two paired circuits at predetermined intervals using windows of a fixed duration. By way of example, the signal energy may be measured every 20 milliseconds using 30 millisecond signal windows. If the energy in the circuit of the calling party is greater than that of the called party, the window is accepted as belonging to that of the called party. If the signal energy is less than that of the called party, it is rejected as cross talk.

Preferably, after speaker separation has been performed, the speech data should be compressed as much as possible to minimize transmission costs. An effective method of compressing the data is to perform the "preprocessing" portion of the Bahler baseline algorithm described in U.S. application Ser. No. 07/922,139. To facilitate compression prior to transmission to a central data storage facility, pre-processing is preferably performed at the local telephone switch of the calling party, as shown in block 36. The main functions of the pre-processing procedure are feature extraction, where frame amplitude and filterbank parameters are derived from the incoming speech signal, frame selection, and spectral amplitude enhancement. Each of the main functions is described below.

In feature extraction, a feature extraction circuit computes frame amplitude and filterbank parameters from each 20 msec frame of the PCM data. The speech signal is sampled M times per second and converted to a 16-bit linear digital representation. This sampled data is processed by performing a 256-point DFT every twenty milliseconds (96 point overlap). A Hamming window is used, without pre-emphasis. Fourteen spectral channels are extracted from this analysis by forming weighted sums of individual DFT spectral power values. The fourteen channels span approximately 300 to 3500 Hertz and are constant bandwidth up to approximately 1000 Hertz, and constant Q thereafter. Each channel has very sharp cutoff (sharper at the upper boundary than at the lower), and crossover is at about the two dB point. Channel weighting is such that white noise input causes equal output in each channel. The frame power is computed by summing the power in all DFT channels and convening the result to dB.

The spectral channel is normalized by first taking the fourth root of each channel power, and $l_2$-normalizing the fourteen component vector of spectral values. The fourth root used in these parameters was suggested by studies of the perception of loudness, and is very similar to a logarithmic transformation over the dynamic range of interest. The channel bandwidths and placements roughly correspond to equal intervals on the mel scale of frequencies. These parameters are used in many applications of speech and speaker recognition, and they are generally found to be robust with respect to noise degradation.

In frame selection, three criteria are imposed to limit the set of frames on which the algorithm operated. First, frames of very low power are eliminated, in order to consider only that portion of the data set that may contain speech. A histogram of power is then formed using all remaining frames in the reference utterance. A nominal interval of acceptable energies is established as the range from the tenth percentile value plus six dB to the 97th percentile minus three dB. If that nominal range is six dB wide or wider, only those frames with energies within it are used. Otherwise, the passing range is widened to six dB of dynamic range in the speech data, but eliminates regions of probable degradation due to extreme clipping and/or noise, if sufficient dynamic range is present in the original data.

The spectral changes across frequency are enhanced by subtracting from each spectral amplitude the neighboring spectral amplitudes, circularly. Hence, $$s_1' = s_1 - s_2$$
$$\vdots$$
$$s_i' = s_i - s_{i+1}$$
$$\vdots$$
$$s_{14}' = s_{14} - s_i$$

The reference speech data for the telephone credit card account customers and the speech data derived from the speech of the calling party are subjected to the above described pre-processing procedure. Pre-processing of the calling party speech data at the local telephone switch eliminates silence periods and reduces the data to the parametric form discussed above. The speech of the calling party, or data derived from it, can be transmitted to the facility at the end of the call.

A further method of compressing the data, "novelty pruning", may also be applied to input utterances and reference utterances. In novelty pruning, each frame in the utterance is considered in turn. The first frame is always saved. The second frame is compared with the first frame to determine the Euclidean distance between the two frame vectors. If the Euclidean distance exceeds a predetermined threshold value, the second frame is also saved; otherwise it is discarded. In like fashion, each subsequent frame is compared with all the frames that have been previously saved. Thus, if the Euclidean distance between each succeeding frame and every saved frame preceding it exceeds the threshold, the new frame is saved.

Together, the pre-processing, speaker separation, and novelty pruning steps discussed above substantially reduce the amount of data that must be transmitted and therefore the cost of transmission. The resulting data may be transmitted on a data grade line as opposed to a speech grade line, further reducing the cost. Before analyzing the pre-processed caller speech data in accordance with the remaining steps of the Bahler algorithm described in U.S. application Ser. No. 07/922,139, a caller speech data base is be collected over a group of users. Since the speech database is to be used in connection with a telephone network, the database speech will be collected over the long distance network to provide for the variations and handset microphones and signal distortions due to the telephone channel. As indicated previously, the reference speech is collected from each customer over a number of conversational telephone sessions in a non-invasive manner so that the customer need not recite or repeat any predetermined authorization phrase.

The compressed reference speech data for all customers, as well as the compressed caller speech data, is stored in a data base at a central facility as shown in block 38. In accordance with the Bahler algorithm, non-parametric algorithms are developed for spotting the occurrences of one or more known, "target" talkers within the caller speech database. Target talkers, in the context of the long distance telephone network, are authorized account holders or users of the long distance phone service whose reference speech data has been compressed and stored in the data base. For purposes of verification, reference speech data from one or more of the account holders whose identity has been claimed by one or more callers is used. The caller speech data consists of any number of callers, for example 50, including at least one caller who claimed the identity a long distance service customer and is represented in the reference speech data.

FIG. 3 is a block diagram of the baseline algorithm showing the processing steps of inter-message matching, score normalization, and queue processing. In the enrollment mode, call speech data samples may be sampled from a potentially open population of callers, using the unrestricted, extemporaneous speech spoken during their respective calls. The algorithm processes the speech samples in a queue, producing a score for each sample. The score is used to reorder the samples in the queue so that the sample containing "key" events is more likely to appear at the front of the queue than at the rear. The sorting algorithm may be embedded in an integrated software system capable of accepting digitized waveform files as input.

While in a preferred embodiment, a caller seeking verification would supply a claimed identity at the outset of a call, the system of the invention may also be operated without such a claimed identity being supplied where a limited population of authorized users is to be verified. In such a alternative environment, rather than sorting voice models given an input sample, the sorting algorithm attempts to son caller speech input samples in search of a given voice, that of an authorized user. Pairings of reference voice models and input caller speech samples are ranked in order of the probability that the voice model matches that of a given authorized user, given the acoustic observations. The comparison provides a score related to the likelihood of the observations being produced by that authorized user. The manner in which these and other properties of the baseline algorithm are obtained will now be described.

Inter-Message Matching

In accordance with the Bahler algorithm, the parameter space has thirteen dimensions and the reference data consists of at most several thousand frames per message. Under these conditions, the square of the nearest neighbor distance not only correlates well with the logarithm of the local density, but the two are also approximately related by the affine transformation:

$$-\log(p_R(u)) = a + bd_{NN}^2$$

for sum constants a and b. The square of nearest neighbor distances is the appropriate value to accumulate to approximate likelihood ratio scoring. Recognizing this as the basis for accumulating the square of the nearest neighbor distances, the following relations are given:

$$d_{u,R} = -\log(p_R(u)) = -\log(p(u|R)) = -\log[p(u,R)/p(R)]$$

$$d_{r,U} = -\log(p_U(r)) = -\log(p(r|U)) = -\log[p(r,U)/p(U)]$$

where $p_R(u)$ is the probability density of the reference message at u, $p_U(r)$ is the probability density of the unknown message at r, and the approximation now includes the affine shift and scale effects of a and b. The $d_{u,R}$ and $d_{r,U}$ are averaged to form the Score values because averaging normalizes the message length and reduces sensitivity to the lack of independence between frames. The Score values are thus approximations of logarithms of conditional probabilities:

$$Score_A = ave_{ueU}[-\log(p_R(u))] = -\log(p(U|R)) = -\log[p(U,R)/P(R)]$$

$$Score_B = ave_{reR}[-\log(p_U(r))] = -\log(p(R|U)) = -\log[p(U,R)/P(U)]$$

where p(U,R) is thought of as the probability that unknown message U and reference message R were spoken by the same talker. In view of the approximate affine relationship of the Score values to the conditional probabilities exhibited above, summing them produces:

$$Score_A + Score_B = \alpha' + \beta' \log[p(U,R)^2/p(R)p(U)]$$

where $\alpha'$ and $\beta'$ are related to a and b in an obvious way. This is the meaning of the match scores before they are modified by score normalization.

FIG. 4 is a schematic diagram illustrating the message matching and scoring process. The term "unknown message" is intended to refer to a caller speech sample while the term "reference message" is intended to refer to stored reference speech data obtained during an enrollment session. Match scores are computed for a combination of unknown and reference messages in two steps. First, each frame of the unknown is compared to every frame of the reference message and given a score equal to the minimum Euclidean squared distance between the unknown and all reference frames. $Score_A$ is set equal to the average of these values over all frames of the unknown message. Next, the same process is repeated, but comparing each frame of the reference to all frames of the unknown, to form $Score_B$. The match score assigned to the comparison of this combination of unknown and reference messages is then the sum of $Score_A$ and $Score_B$. Stated mathematically, this process is summarized as follows. If we let $u_j$ be the j-th frame of unknown message U and $r_i$ be the i-th frame of reference message R, the "distance" from $u_j$ to the reference message is:

$$d_{j,R} = min[|u_j - r_i|^2]$$

and the "distance" from $r_i$ to the unknown message U is:

$$d_{i,U} = min[|u_j - r_i|^2]$$

The resulting scores are:

$$Score_A = ave\ [d_{j,R}]$$

$$Score_B = ave\ [d_{i,U}]$$

The remaining processing operates on scores found by "matching" the messages in the message queue of unknown messages against the reference speech data of the authorized long distance account holder or user whose identity is being verified. The presence of P(R) and P(U) in the expression above also indicates that proper interpretation and use of the scores has to take into consideration speaker a priori probabilities and unconditional message probabilities, which justifies the need for further normalization.

Score Normalization

The speaker scoring algorithm incorporates three especially important normalization procedures: scoring relative to a representative set of callers; normalizations with respect to unconditional message probability; and removal of biases due to inference data variability. The first two normalizations are obtained using reference data for a representative set of talkers, which may often include data for non-target speakers. The third normalization is achieved by using z scores.

Referring to FIG. 5, normalization of raw message-to-message match scores with respect to a group of reference talkers, which is accomplished by forcing the rows of the raw score matrix to zero, normalizes scores with respect to the unconditional probability of the message. Rational comparison of one message's likelihood of having been spoken by a target talker to that of another message requires such a normalization, and it is done by de-meaning each row. It is critical, however, that this normalization be done with respect to a large enough sample of reference talkers to avoid accidentally destroying information in the raw scores.

Use of the negative z score, which normalizes scores with respect to the variance of scores over the message queue, takes into account the observed fact that reference messages usually have an inherent bias which manifests itself as a propensity toward larger or smaller score values against all messages, whether by the same talker or not. In implementation, match scores are computed, for each caller speech message to be verified, in the queue against each reference message (i.e., reference data of one or more account holders whose identity has been used to make a call), as shown in FIG. 4. Treating this set of match scores as a matrix, one column per reference message and one row per caller speech message in the queue, the scores are first normalized across rows by subtracting the constant for each row which reduces its mean to zero. This is the very important normalization of the scores with respect to target talkers and reference talkers. Scores are then normalized within columns, by replacing each with its negative z score relative to the column mean and variance. These two normalizations can be expressed mathematically as follows. Let the original scores in the (Message queue)×(Reference messages) matrix be denoted dm, r. Then:

$$d_{m,r} = Score_A(U_m, R_r) + Score_B(U_m, R_r)$$

The result of normalization with respect to the reference set is replacement of dm,r by $d'_{m,r}$, where $$d'_{m,r} = dm,r - \frac{1}{|R|} \sum_{r=1}^{|R|'} dm,r'$$

and the final score for each message in the queue and each reference message is:

$$d''_{m,r} = - \frac{d'_{m,r} - <d'_{m,r}>_m}{\sqrt{var_m(d'_{m,r})}}$$

where $<d'_{m,r}>_m$ is the mean of the score column for reference message r and $var_m(d'_{m,r})$ is the variance of the scores in that column.

Queue Processing

A queue is sorted on the basis of a set of z scores for each reference message in the queue and the target caller or callers whose speech is to be verified. Each target caller is given a match score against each reference message in the queue equal to the average of all normalized match scores for his reference data against that message. This produces a matrix of scores of each queue message against the target caller.

Queues are then sorted as follows. If the speech of only one caller is to be identified at a time, the queue is ordered on descending values of the (single) final score value, larger scores indicating greater posterior probability of the talker. When the speech of more than one talker is to be verified at a time, each queue message is given a target set score by treating the message/talker scores as proportional to the logarithm of the Bayes ratio, i.e., the conditional probability of the unknown message, given the talker, divided by the unconditional probability of the message. The score given to each message for the whole target talker set (consisting of callers whose speech is to be verified) is then:

$$Sm = \sum_{KT} e^{Sm'} P_t'$$

where T is the set of target talkers, $S_{m,t}$ is the message/talker score for message m and talker t, and $P_t$ is the a priori probability that talker t is in the queue. The queue is sorted on descending values of this sum, with larger values indicating greater likelihood that a message in the queue is from one of the target talkers.

Passive monitoring practiced in accordance with the present invention would be most cost effective if applied to selected calls. Fraud is concentrated in specific geographic areas and limited to a small number of customers. The greatest losses, for example, are incurred in overseas calls. Often, fraudulent activity causes sudden increases relative to customer's normal rates of long-distance usage. Criteria based upon these facts could be used to select calls to be monitored in accordance with the aforementioned algorithm. The fact that passive monitoring is "invisible" to the caller increases the effectiveness of monitoring calls selected at random.

Although the present invention has been described in detail, it should be understood that various changes, substitutions, and alterations can be made herein without departing from the spirit and scope of the invention as defined by the appended claims.

What is claimed is:

1. A method of verifying that a person using a telephone network has an identity corresponding to one of a plurality of previously established identities, comprising the steps of:
    storing reference frames of speech for a plurality of persons, each of said persons being associated with one of said plurality of previously established identities, each said speech frame including a plurality of speech feature vectors, said speech feature vectors being non-parametric in nature;
    establishing a claimed identity for a person seeking verification;
    passively monitoring a conversation via said telephone network between said person seeking verification and a called party to obtain a sample of said person's speech, said speech sample being thereafter processed into frames of speech; and
    comparing said sample with at least one reference set to determine whether said person seeking verification corresponds to said claimed identity, wherein said comparison includes generating a match score derived from a determination of nearest neighbor Euclidean distance between frames of speech associated with said speech sample and frames of said reference speech.

2. The method according to claim 1, further including the step of forming each set of reference speech data by passively monitoring at least one conversation over said telephone network between a person established as having said claimed identity and a called party.

3. The method according to claim 1, wherein each said speech frame for said speech sample obtained in said passive monitoring step includes a plurality of speech feature vectors.

4. The method according to claim 1 further including the step of normalizing the match scores relative to the reference speech data.

5. The method according to claim 1, wherein the step of passive monitoring includes digitizing a speech sample indicative of unrestricted, extemporaneous speech made over said telephone network by said person seeking verification into a frame set of unknown speech features.

6. The method according to claim 2, further including repeating said passive monitoring step for a conversation made over said telephone network by at least one additional person established as having another claimed identity to obtain a respective sample of said at least one additional person's speech.

7. The method according to claim 6, further including the step of digitizing said respective samples into respective frame sets of reference speech dam during said passive monitoring step.

8. The method according to claim 7, wherein speech frames obtained during an iteration of said passive monitoring step subsequent to an iteration wherein said respective samples are obtained and digitized are compared to a plurality of reference sets during said comparing step.

9. The method according to claim 1, wherein said passive monitoring step is performed at a local switching station.

10. The method according to claim 5, wherein said passive monitoring step includes compressing digitized frame sets of unknown speech features indicative of speech by the person seeking verification and storing compressed speech feature data at a central facility.

11. The method according to claim 1 further including the step of selecting speech frames to be compared in said comparing step depending upon expected speech information contained therein.

12. The method according to claim 10, further including the step of selecting a first frame of each set of sampled speech features for storage and selecting subsequent frames of each set only if the Euclidean distance between each succeeding frame and every saved frame preceding it exceeds a predetermined threshold.

13. The method according to claim 1, further including generating said match score which is a sum of a $Score_A$ set equal to the average of the minimum Euclidean squared distance between a speech frame of an unknown person and all frames of a reference set over all sampled frames of said unknown persons, and $Score_B$ set equal to the average of the minimum Euclidean squared distance between each frame of the reference set to all frames of said unknown persons,
    wherein the "distance" from $u_j$ to reference message R is:

$$d_{j,R} = min[|u_j - r_i|^2]$$

and the "distance" from $r_i$ to the unknown message U is:

$$d_{i,U} = min[|u_j - r_i|^2]$$

wherein $u_j$ is the j-th frame of unknown message U and $r_i$ is the i-th frame of reference message R, and $$Score_A = ave\ [d_{j,R}]$$

$$Score_B = ave\ [d_{i,U}]$$

14. The method according to claim 1, further including the step of measuring the signal energy in each of two paired circuits during said passive monitoring step, one of said circuits corresponding to said unknown person and the other of said circuits corresponding to a party called by said unknown person, during each phone call being monitoring at predetermined intervals using windows of a fixed duration and accepting only windows in which the energy in the circuit of the calling party is greater than that of the called party.

15. An apparatus for verifying that a person using a telephone network has an identity corresponding to one of a plurality of previously established identities, comprising:

means for storing reference frames of speech for a plurality of persons, each of said persons being associated with one of said plurality of previously established identities, each said speech frame including a plurality of speech feature vectors, said speech feature vectors being non-parametric in nature;

means for establishing a claimed identity for a person seeking verification;

means for passively monitoring a conversation via said telephone network between said person seeking verification and a called party to obtain a sample of said person's speech, said speech sample being thereafter processed into frames of speech; and means for comparing said sample with at least one reference set to determine whether said person seeking verification corresponds to said claimed identity, including means for generating a match score derived from a determination of nearest neighbor Euclidean distance between frames of speech associated with said speech sample and frames of said reference speech.

16. The apparatus of claim 15, further including digitizing means for digitizing speech signals for each of said plurality of persons into said reference speech frames and for digitizing speech signals from unrestricted, extemporaneous caller speech made during calls on said telephone network by said person seeking verification into said sample speech frames.

17. The apparatus of claim 16, further including means for processing said digitized speech frames into respective sets of speech feature vectors and means for comparing speech feature vectors of said person seeking verification with speech feature vectors of at least one of said plurality of persons.

18. The apparatus according to claim 15, further comprising a means for measuring the signal energy in each of two paired circuits in said telephone network, one of said circuits constituting a communications path corresponding to said unknown person and the other of said circuits constituting a communications path corresponding to a party called by said unknown person at predetermined intervals using windows of a fixed duration and wherein frames of speech are accepted as that of said unknown person only for windows in which the energy in the circuit corresponding to said unknown party is greater than that of the circuit corresponding to said called party.

19. The apparatus according to claim 17, further including means for performing a non-parametric comparison of a set of speech feature vectors corresponding to said person seeking verification to a reference set of speech features corresponding to a person whose identity is claimed by said person seeking verification.

20. The apparatus according to claim 17, wherein said processing means further includes means for selecting a first frame of each set of sampled speech features for storage and for selecting subsequent frames of each set only if the Euclidean distance between each succeeding frame and every saved frame preceding it exceeds a predetermined threshold.

21. An apparatus for verifying the identity of an unknown caller on a telephone network, comprising:

means for receiving unrestricted, extemporaneous input from said unknown caller;

means for coding the input speech into a non-parametric set of speech feature vectors; and means for performing a non-parametric comparison of a set of speech features corresponding to said unknown caller to a reference set of speech features corresponding to an identity claimed by said unknown person.

* * * * *